US006650370B1

(12) United States Patent
Bradley et al.

(10) Patent No.: US 6,650,370 B1
(45) **Date of Patent: *Nov. 18, 2003**

(54) APPARATUS FOR COUPLING MULTIPLE DATA SOURCES ONTO A PRINTED DOCUMENT

(75) Inventors: William C. Bradley, Sudbury, MA (US); Mark L. Mesher, Wenham, MA (US)

(73) Assignee: Viisage Technology, Inc., Littleton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/103,055

(22) Filed: Jun. 23, 1998

Related U.S. Application Data

(63) Continuation of application No. 08/486,958, filed on Jun. 7, 1995, now Pat. No. 5,771,071, and a continuation-in-part of application No. 08/316,041, filed on Sep. 30, 1994, now Pat. No. 5,646,388, which is a continuation-in-part of application No. 08/262,552, filed on Jun. 20, 1994, now Pat. No. 5,757,431.

(51) Int. Cl.[7] .......... H04N 5/225

(52) U.S. Cl. .......... 348/344; 348/373; 235/380; 382/294

(58) Field of Search .......... 235/375, 380, 235/381; 358/1.1, 1.6, 1.18, 443, 450; 382/115, 117–119, 293, 294; 396/310, 315, 322, 332, 429; 348/49, 50, 54, 58, 207, 218, 239, 335, 340, 343, 344, 373, 375

(56) References Cited

U.S. PATENT DOCUMENTS

| | | | |
|---|---|---|---|
| 4,245,902 A | 1/1981 | Cataldo et al. | 354/76 |
| 4,248,510 A | 2/1981 | Baker et al. | 354/109 |
| 4,459,021 A | 7/1984 | Blazek | 356/71 |
| 4,540,259 A | 9/1985 | Blakely et al. | 354/109 |
| 4,616,327 A | 10/1986 | Rosewarne et al. | 364/518 |
| 4,642,700 A | 2/1987 | Ohta et al. | 358/285 |
| 4,660,221 A | 4/1987 | Dlugos | 380/23 |
| 4,687,526 A | 8/1987 | Wilfert | 156/94 |
| 4,701,040 A | * 10/1987 | Miller | 396/315 |
| 4,712,909 A | 12/1987 | Oshikoshi | 355/20 |

(List continued on next page.)

FOREIGN PATENT DOCUMENTS

| | | | |
|---|---|---|---|
| EP | 0 412 520 | 2/1991 | G06K/15/00 |
| EP | 0 440 814 | 8/1991 | G07F/7/08 |
| EP | 0 513 885 | 11/1992 | G06K/7/06 |
| JP | 2-307181 | 12/1990 | G06K/17/00 |
| JP | 3-090994 | 4/1991 | G07G/1/12 |
| JP | 3-269787 | 12/1991 | G07B/1/00 |
| JP | 05-290063 | 11/1993 | G06F/17/00 |
| JP | 06-51397 | 2/1994 | G03B/17/53 |
| WO | WO 92/17856 | 10/1992 | G06K/5/00 |
| WO | WO 93/16447 | 8/1993 | G07F/17/26 |

*Primary Examiner*—Ngoc-Yen Vu
(74) *Attorney, Agent, or Firm*—Lahive & Cockfield, LLP

(57) ABSTRACT

A system for providing a printed output image including information from a data collection system onto a single print medium is disclosed. Data collection systems and methods are disclosed for collecting data from a plurality of spatially separated sources and for providing that data as a sequence of output signals. The data collection system includes a housing a selection element, one or more image paths and an image plane. The selection element selectively and alternatively couples visual images from separate object sources along the image paths and onto the image plane. The selection element may include optical shutters for selectively occluding or transmitting the visual images and may include illumination elements for providing a controlled sequence of illumination at selected ones of the object sources. The system can assemble the printed data in a format suitable for printing as an identification card.

12 Claims, 11 Drawing Sheets

U.S. PATENT DOCUMENTS

| | | | | | |
|---|---|---|---|---|---|
| 4,754,487 | A | | 6/1988 | Newmuis | 382/2 |
| 4,864,108 | A | | 9/1989 | Hamada et al. | 235/380 |
| 4,934,846 | A | | 6/1990 | Gilham | 235/432 |
| 4,993,068 | A | | 2/1991 | Piosenka et al. | 380/23 |
| 5,003,405 | A | | 3/1991 | Wulforst | 358/400 |
| 5,006,885 | A | | 4/1991 | Greenspan | 355/43 |
| 5,025,399 | A | | 6/1991 | Wendt et al. | 364/519 |
| 5,028,994 | A | | 7/1991 | Miyakawa et al. | 358/92 |
| 5,151,582 | A | | 9/1992 | Fujioka | 235/469 |
| 5,157,424 | A | | 10/1992 | Craven et al. | 346/160 |
| 5,180,906 | A | | 1/1993 | Yamada | 235/487 |
| 5,181,786 | A | | 1/1993 | Hujink | 400/61 |
| 5,199,081 | A | | 3/1993 | Saito et al. | 382/2 |
| 5,268,963 | A | | 12/1993 | Monroe et al. | 380/23 |
| 5,270,839 | A | | 12/1993 | Parulski et al. | 358/474 |
| 5,272,322 | A | | 12/1993 | Nishida et al. | 235/456 |
| 5,337,358 | A | | 8/1994 | Axelrod et al. | 235/380 |
| 5,384,859 | A | | 1/1995 | Bolza-Schunemann et al. | 382/112 |
| 5,410,642 | A | * | 4/1995 | Hakamatsuka | 358/1.14 |
| 5,432,864 | A | | 7/1995 | Lu et al. | 382/118 |
| 5,438,359 | A | | 8/1995 | Aoki | 348/207 |
| 5,475,441 | A | | 12/1995 | Parulski et al. | 348/552 |
| 5,505,494 | A | | 4/1996 | Belluci et al. | 283/75 |
| 5,506,617 | A | | 4/1996 | Parulski et al. | 348/207 |
| 5,635,012 | A | * | 6/1997 | Belluci | 235/380 |
| 5,646,388 | A | * | 7/1997 | D'Entremont | 235/380 |

* cited by examiner

APPARATUS FOR COUPLING MULTIPLE DATA SOURCES ONTO A PRINTED DOCUMENT

This application is a continuation of U.S. patent application Ser. No. 08/486,958, filed Jun. 7, 1995, entitled "Apparatus for Coupling Multiple Data Sources Onto A Printed Document" (now U.S. Pat. No. 5,771,071, issued. Jun. 23. 1998) which is a continuation-in-part of U.S. patent application Ser. No. 08/262,552, filed Jun. 20, 1994, entitled "Apparatus for Coupling Multiple Data Sources Onto A Printed Document" (now U.S. Pat. No. 5,757,431, issued May 26, 1998) and a continuation-in-part of U.S. patent application Ser. No. 08/316,041, filed Sep. 30, 1994, entitled "Systems and Methods for Recording Data" (now U.S. Pat. No. 5,646,388, issued Jul. 8, 1997). The above cited patent applications, assigned to a common assignee, Lau Technologies, Acton, Mass., are incorporated herein by reference.

FIELD OF THE INVENTION

The present invention relates generally to the field of data acquisition and processing. More particularly, the present invention relates to apparatus and methods for acquiring data from multiple sources and for processing and integrating the acquired data into a printed output.

BACKGROUND OF THE INVENTION

Businesses, government agencies, and other establishments rely on identification cards to allow authorized individuals to access restricted facilities, funds, or services. Identification cards such as driver's licenses, military identification cards, school identification cards, and credit cards are simple and convenient ways to provide some security in situations where general public access to either facilities or services is restricted. However, the security which heretofore has been provided by these identification cards, is now being undermined by advancements in reproduction technology that have facilitated the production of high quality forged identification cards. As reproduction technology has advanced, the need has arisen for identification cards which are more difficult to forge and therefore more secure.

A number of tactics have been suggested for making identification cards more difficult to forge. For example, government agencies responsible for issuing driver's licenses have proposed that an image of the driver's fingerprint can be encoded onto the driver's license. Additionally, it has been suggested that new encoding schemes, such as bar codes and magnetic stripes, can encode identifying information in a manner that makes it more difficult to produce forgeries.

However, the manufacture of these improved identification cards has proven to be more expensive and more time consuming than the manufacture of traditional identification cards.

The systems presently employed for manufacturing these more complicated identification cards are relatively unsophisticated. Typically, these systems include a series of disconnected stations that each perform a separate function. In operation, a person passes through each station where identifying information is collected for integration into the identification card. For example, at a first station for making driver's licenses, the Registry operator takes a photograph of the driver. At a second station, a second Registry operator takes identifying information from the driver, such as height, eye color, address and so forth, and enters this data into a computer system via a keyboard. The computer generates an identification card with the identifying information regarding the driver, and the photograph is fixed to the identification card in the appropriate space. A third operation laminates the card, and makes the card available to the driver.

These unsophisticated prior art systems are relatively cumbersome and labor-intensive. Furthermore, because each station requires equipment, space and operator attention, these systems are expensive to operate and maintain.

Also troublesome is the lack of uniformity between identification cards generated by these prior art systems. Because the uniformity of the photograph data is effected by operator error and the ambient light at the photographing station, there can be a wide range of exposure levels for photographs taken at different stations. This lack of uniformity makes it more difficult to detect forgeries and, therefore, reduces the security provided by the identification card.

Accordingly, an object of the present invention is to provide an improved unitary system for acquiring data from different sources and for processing the data so that it can be printed out in an integrated format.

A further object is to provide a system for acquiring data from multiple sources that reduces the equipment costs associated with image acquisition.

Another object of the present invention is to provide a system for acquiring images from multiple data sources that increases the uniformity of printed image data between identification cards.

An additional object of the present invention is to reduce the need for photographic image collection.

Another additional object of the present invention is to provide a system that reduces the need for keyboard data entry of identifying information.

SUMMARY OF THE INVENTION

The present invention includes apparatus and methods for efficiently acquiring data from a plurality of different data sources. In one aspect, the invention is understood as systems for acquiring data from a plurality of different sources for the manufacture of identification cards such as driver's licenses, military identification cards, school identification cards and credit cards. The invention can be further understood as a system that includes a data collection unit, a signal processor, and a printer.

The data collection unit includes elements for collecting data from a plurality of spatially separated sources and for providing that data as a sequence of output signals, typically on a single output connector. The data collection system may include an image plane that can receive image data from a plurality of spatially distributed object sources. The collection system has a selection element that selectively and alternatively couples the object sources to the image plane. An optical conversion element, positioned at the image plane, can acquire the image projected on the image plane and generates output signals representative of the collected images.

The data collection unit includes a plurality of image paths that optically engage the object sources to the image plane. These object sources can include photographs, written text, people, barcodes, images of finger prints and other sources of image information. The image plane may be positioned at a known point where image data collected from the object sources is directed. The collection unit can be assembled within a housing the housing can have at least one image path that optically couples the object sources to the image plane. The image path can extend through the housing if the image plane is positioned exterior to the housing, or it can extend between an object source and an image plane positioned within the housing. Typically, an optical conversion element, such as a video camera, is positioned on the housing for receiving visual images from the image plane and for generating output signals that represent the visual images projected onto the image plane. A selection element may selectively and alternatively couple visual images from separate object sources along the image paths and onto the image plane. The selection element may include optical shutters for selectively occluding or transmitting visual images and may include illumination elements for providing a controlled sequence of illumination at selected ones of the image sources. The illumination elements can alternatively illuminate one or the other of the image sources to alternatively couple one of the object sources to the image plane. In addition, mechanical elements can be employed to perform some of these functions.

The data collection unit may further include a magnetic sensor element, optionally connected either permanently or detachably, to the housing, for sensing information stored on a magnetic medium and for providing within the sequence of output signals generated by the collection unit, a series of output signals representative of the magnetic information. The data collection unit may also include a bar-code reader, which can collect data from a bar-code image received from one of the object sources. In some embodiments, the data collection unit can include a focus adjustment element for focusing one of the object sources onto the image plane. The focus adjustment element can include an ultrasonic or infrared focusing unit that measures a signal representative of the distance between the data collection unit and the object source being imaged, and can further include an adjustable lens element that can be adjusted according to the distance measured by the focus adjustment unit. Alternatively, the data collection unit can include a focus element with sufficient depth of focus, to focus onto the image plane image data from object sources at a range of positions.

In a further embodiment of the invention, a system is provided for generating a printed output image that includes information from a plurality of sources, and for printing the information onto a single print medium. This system can comprise a data collection and signal generating device, generally as described above, for generating at its output a sequence of data signals that represent a plurality of spatially separated image sources. The data collection unit of the system can further include a selection means for selectively and alternatively coupling visual images from each of the object sources along the image path and onto the image plane. As indicated above, the selection element can include one or more selection devices such as, optical shutters for selectively occluding and transmitting the visual images, illumination elements for providing in a controlled sequence illumination of selected ones of the plurality of object sources, or mechanical elements for selecting specific object sources including a mechanical system for alternatively and selectively moving object sources into an image path. A signal processor, typically a computer unit couples to the data collection unit and may control the collection unit to collect data according to a selected sequence. The signal processor can control the data collecting unit responsive to either operator commands, a set of programmed instructions, or a combination of both. The system can also include a printing device for generating the printed output image and would typically include a signal processor coupled between the signal generating elements and the printing device, for providing from the output data signals a series of printing control signals for operating the printing device. The printing device may couple to the signal processor either by a direct connection or via a communication link. A communication link may be a telecommunication, such as a modem, a wireless communication link, such as a radio-frequency transmitter, or any other type of communication link suitable for transmitting data to a remote location. The printer may include a communication link for receiving data and instructions from the signal processor, or from a plurality of signal processors, all sharing the same printing device.

A fuller understanding of the nature and objects of the invention can be understood with reference to the following description of exemplary embodiments of the present invention.

DESCRIPTION OF THE ILLUSTRATED EMBODIMENTS

Figure 1:
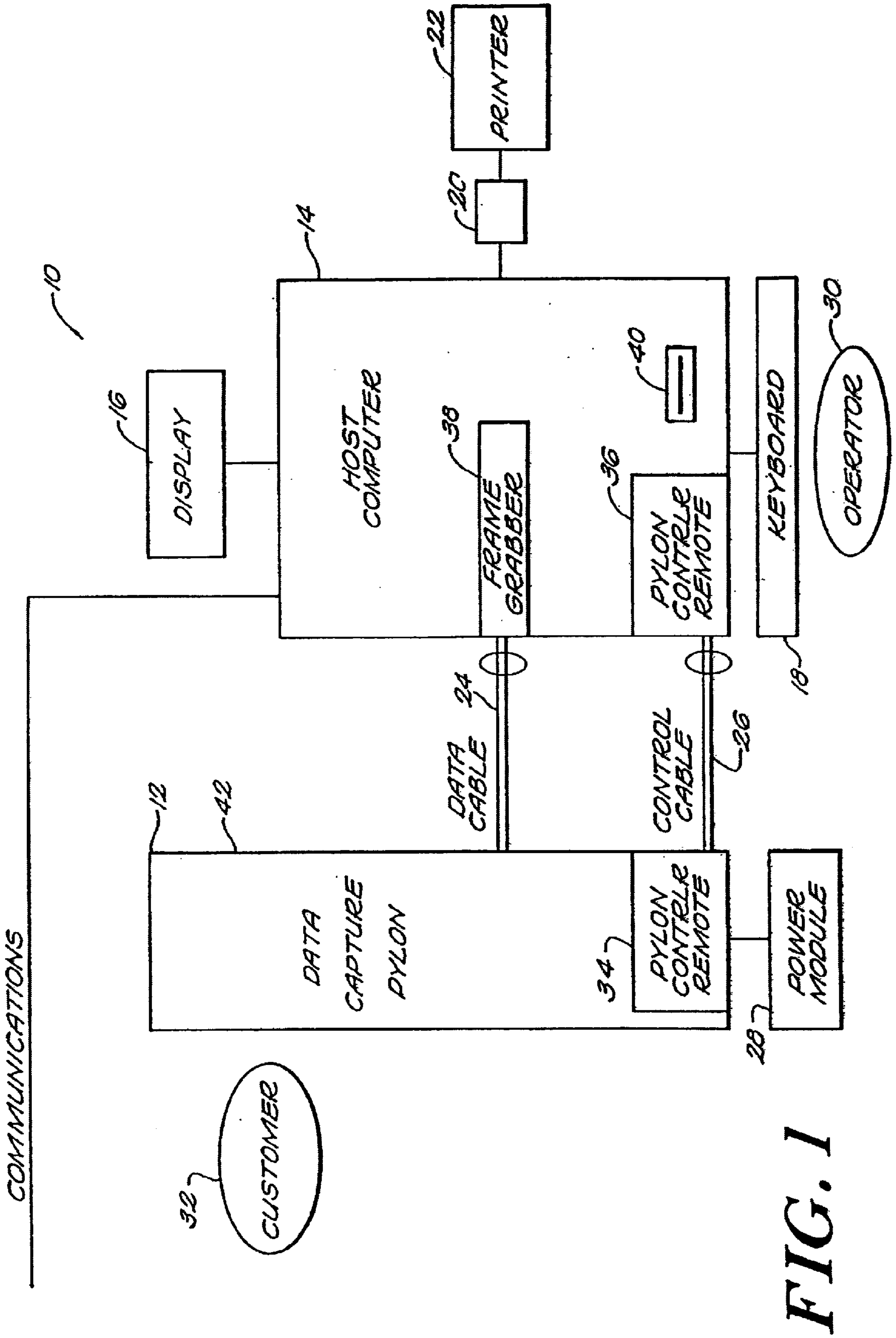
FIG. 1 is a system block diagram of a data collection signal processing, and printing system constructed according to the present invention.

FIG. 1 illustrates one embodiment of a data collection, signal processing and printing system 10 constructed according to the present invention. System 10 includes a data capture pylon 12, a signal processor 14, an optional display 16, a keyboard 18, an optional modem 20, and a printer 22. The data capture pylon 12 connects to the host computer 14 via data cable 24 and control cable 26. In the illustrated embodiment, the data capture pylon 12 connects via a power cable to a power module 28. In one practice, an operator 30 can enter control commands and data via the keyboard 18 while the image of a customer 32 can be collected by the data capture pylon 12.

The illustrated system 10 includes a single data capture pylon 12 for capturing images for an identification card for a customer 32, and for transferring the images to a host computer 14 which serves generally as the signal processor for the system 10. Alternative embodiments of the present invention can have a plurality of data capture pylons coupled to the signal processor 14 for acquiring data for multiple customers 32. While this description refers to a customer 32, it will be realized that the function may be broader than the term the customer may imply. In this respect what is intended is that customer may be realized as a unifying concept item which has some image and data sources related to it, information from which is to be integrated on a single print medium. A customer can be a person or an object, such as a manufacturing part being cataloged with a part number date and inspection number. An optional telecommunication link via modem 20 connects the host 14 to the printer 22. The printer 22 can be a printer located at a central printing facility for large-scale manufacturing of identification cards or can be located with a single data capture pylon or a cluster of data capture pylons at one location The illustrated system 10 is an operator controlled system that allows the operator 30 to control the collection of data by entering keyboard commands at the optional keyboard 18 and by visually monitoring via the optional display 16 the image data that is collected by the data capture pylon 12. FIG. 1 further illustrates a signal processor 14 having an optional disk drive unit 40. The disk drive unit 40 can be any disk drive unit capable of reading stored data, instructions, or other such information that is typically stored on a magnetic media, such as a floppy disk or a magnetic tape. In some embodiments this function may be automatic, and typically is performed under the control of host computer 14.

The data capture pylon 12 collects data in a plurality of different formats from a plurality of different sources and transmits the data to the host computer 14. The illustrated data capture pylon 12 has a housing 42 constructed to facilitate positioning of the data capture pylon 12 and the sensors incorporated therein proximate to a customer. In the illustrated embodiment, the image capture pylon 12 includes a pylon remote controller 34 connected via control cable 26 to the pylon controller host unit 36 located within the host computer 14. The pylon remote controller 34 receives control signals generated by the host computer 14 for operating the data capture pylon 12. In the illustrated embodiment, video data captured by the pylon 12 is transmitted back to the host computer via data cable 24.

Figure 2:
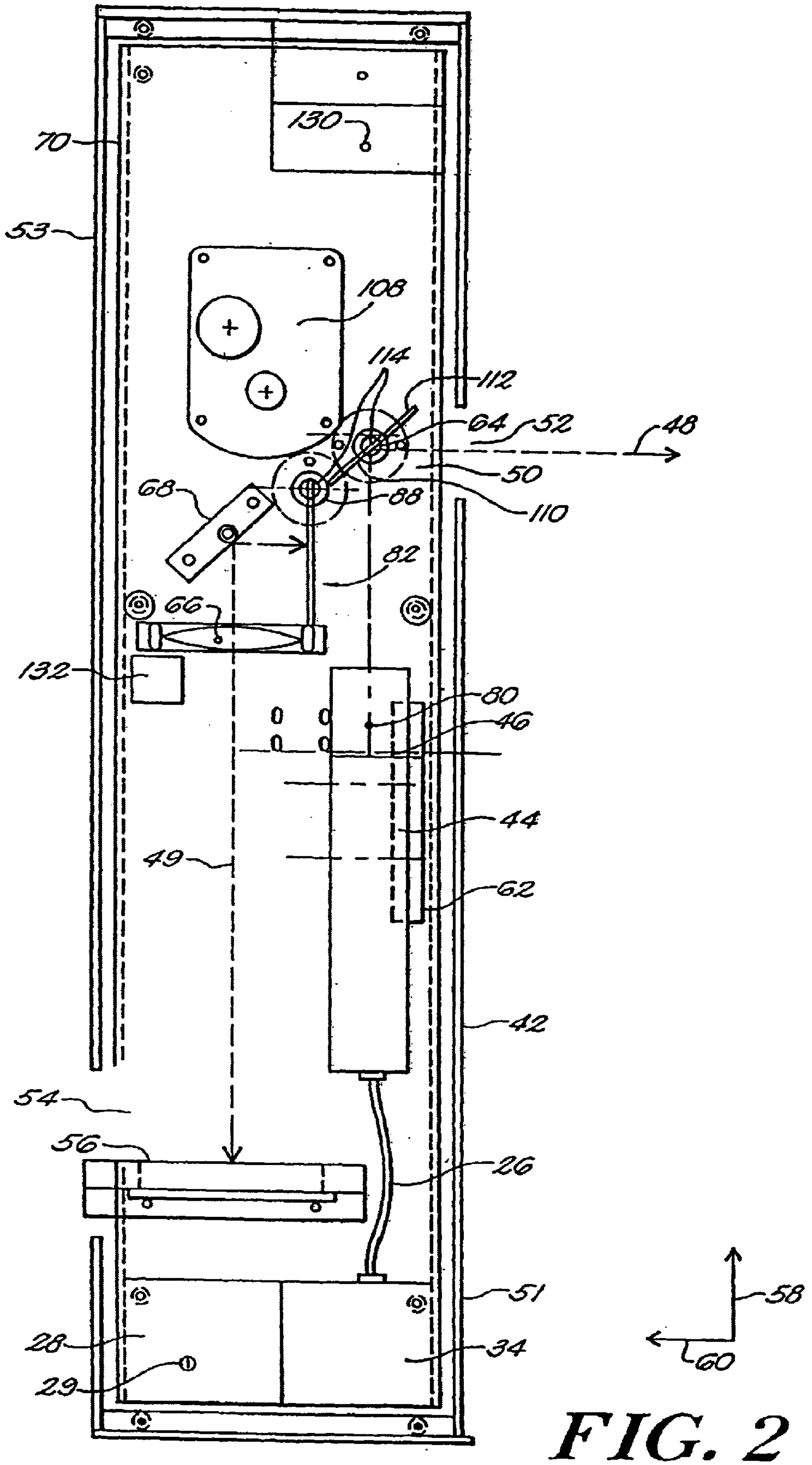
FIG. 2 is a schematic diagram of the data capture pylon of the system depicted in FIG. 1.

With reference to FIG. 2, one embodiment of a data capture pylon 12 constructed according to the present invention for acquiring data from multiple sources is depicted. The data capture pylon 12 illustrated in FIG. 2 includes a housing 42, an optical conversion element 44, an image plane 46 extending through the conversion element 44, optical paths 48 and 49, and a selection element 50.

The illustrated housing 42 is a rectangular tower dimensioned for housing the conversion element 44 and the selection element or elements 50. The illustrated housing 42 extends approximately 2 feet relative to axis 58 and approximately 5 inches relative to axis 60. The illustrated housing 42 extends approximately 5 inches in the direction orthogonal to the plane formed by the axes 58 and 60. In a preferred embodiment the housing is a secure structure, such as an aluminum cabinet with a locked cabinet door, for safeguarding the equipment therein. As dimensioned, the data capture pylon 12 can be placed on a stationary table, or fitted within a moving vehicle so the system 10 can be part of a mobile unit for collecting information for incorporation and integration into identification cards. The power module 28 can have a key operated power switch 29, for providing a data collection system 10 that can only be operated by an authorized operator having the power control key. This safeguards the unauthorized use of the system 10.

In other embodiments of the housing 42, the housing can be dimensioned to include the signal processor 12 and the printer 22. Furthermore, the housing 42 can be a booth having a seat for the customer 32 positioned at a point selected according to the focal range of the data collection system 10. The optional keyboard 18 and optional video monitor 16 can be positioned inside the booth housing 42 so that the customer 32 can act as the operator 30 and operate the data collection system 10.

The illustrated housing 42 has a first port 52, a second port 54 and a shelf 56. The selection element 50, described in greater detail hereinafter, is mounted to an optical bench 70 of the housing 42, and is positioned within the image paths 48 and 49. In the illustrated housing 42, the image plane 46 is located in a spatially fixed position, disposed within the optical conversion element 44. The optical conversion element 44 is mounted by a bracket 62 to a sidewall 51. In the illustrated embodiment, the port 52, that extends through the sidewall 51, is positioned above the conversion element 44 relative to axis 58. The shelf 56 mounts against the optical bench 70 which is fixed to the housing 42. The shelf 56 extends through the port in the sidewall 53. The illustrated optical bench 70 is a support wall that carries the optical elements within the housing 42. Optical bench, as the term is used herein, describes the broad class of structures that are capable of holding the elements that form the image paths 48 and 49, the selection element 50, and other miscellaneous elements, such as the shelf 56. The term optical bench is not to be narrowly defined to any particular type of optical support or to be construed as limited to any particular axis, either the horizontal or vertical. The port 54 of the illustrated embodiment is dimensionally adapted to accept a 3×5 notecard or other object for disposition on shelf 56. The image paths 48 and 49 of the illustrated embodiment extend through the interior of housing 42 to optically couple spatially distributed object sources, such as a notecard positioned on shelf 56, and an object external to the housing 42, with the image plane 46.

In one preferred embodiment of the present invention, the interior sidewalls of the housing 42 are painted flat black to reduce light reflections within the interior of housing 42. It should be apparent to one of ordinary skill in the art of optics, that other colors or coating materials can be used to suppress light reflections and reduce ambient light within the interior of housing 42 in order to improve the optical transmission of images through the housing 42.

With reference again to FIG. 2, it can be seen that the image plane 46 is a projection plane on which image data from the object sources can be focused and projected. In the illustrated embodiment, the image plane 46 is located within housing 42 and is disposed along a common portion of image paths 48 and 49. However, as will be described in greater detail hereinafter, alternative structures for positioning the image plane 46 can be employed with the present invention.

It should be apparent to one of ordinary skill in the art that further alternative embodiments of a data capture pylon 12 having a single optical conversion element 44 can be mechanically arranged within housing 42 for acquiring image data from multiple image sources.

Image paths 48 and 49 may contain various optical elements for optically steering and directing visual images onto the image plane 46. The illustrated image path 48 includes the port 52 extending through sidewall 51, the steering mirror 64, the selection element 50 that includes a flip-mirror assembly 82 and a mechanical linkage assembly (not shown), and the image plane 46. The image path 48 acquires image data from sources exterior to the housing 42. For example, image path 48 can acquire the image of an applicant for a driver's license positioned at some point exterior to the data capture pylon 12. The image of the applicant transmits through port 52, reflects off steering mirror 64, passes through the selection element 50 when the selection element 50 connects the image path 48 to the image plane 46, and projects onto the image plane 46 which, in the illustrated embodiment, is coincident with a CCD element in the optical conversion element 44.

Similarly, image path 49 may include elements for optically coupling an image source with the image plane 46. The depicted image path 49 includes the shelf 56, the lens 66, the fixed mirror 68, the selection element 50 and the image plane 46. In FIG. 2, the selection element 50 is optically coupled to the image plane 46 through a common portion of both the image paths 48 and 49.

Figure 3:
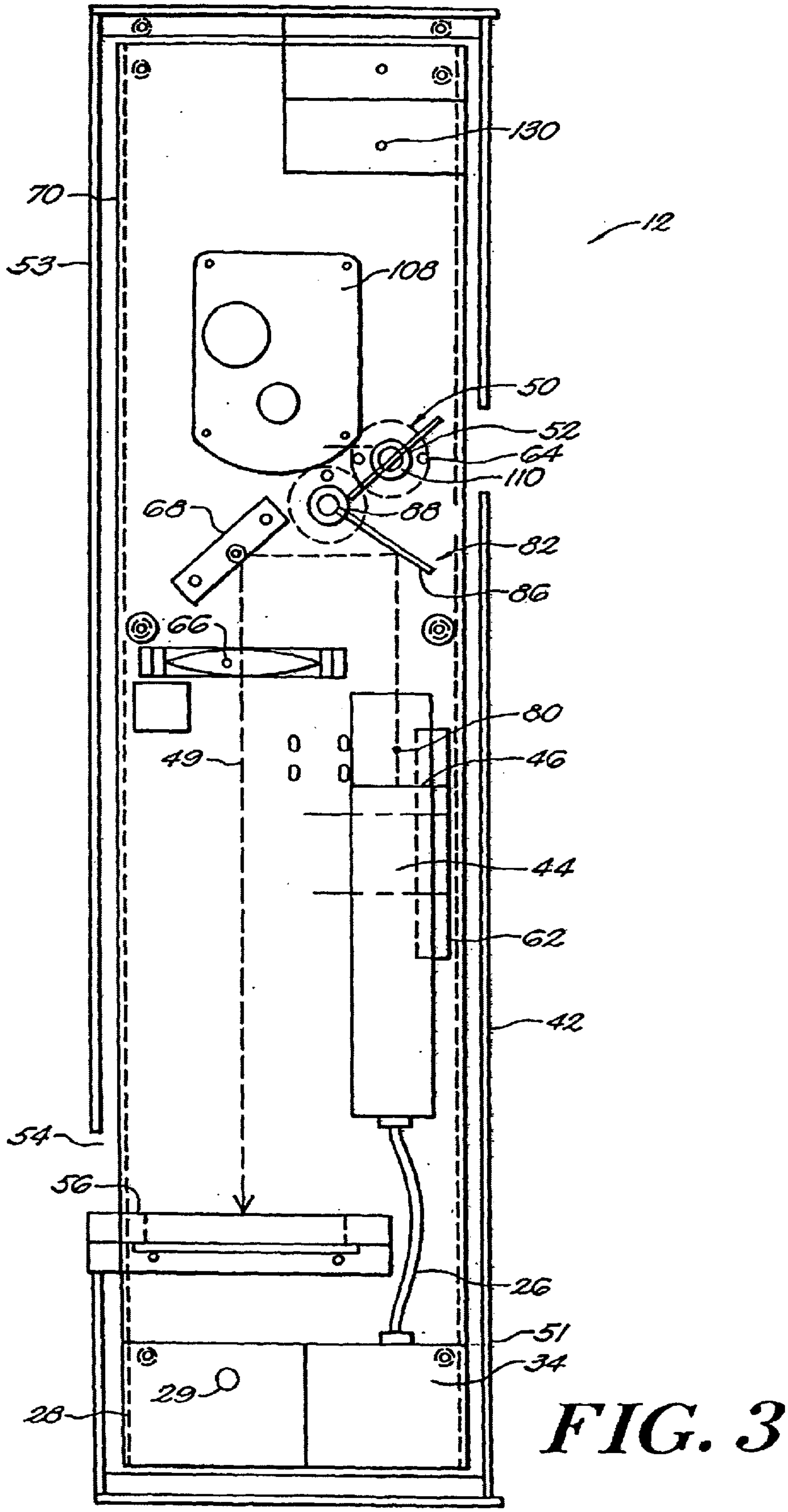
FIG. 3 is a schematic diagram of the data capture pylon with a flip mirror in an alternative position.

Alternatively, as depicted by FIG. 3, the selection element 50 can be positioned to optically couple the image path 49 with the image plane 46. Accordingly, when the selection element 50 couples image path 49 with the image plane 46, the lens 66, fixed mirror 68 and flip-mirror 82 transmit a visual image of an image source located on the shelf 56 to the image plane 46. In one example, a 3×5 inch notecard containing a signature for an applicant for a driver's license a fingerprint, barcode or other written data, can be placed on shelf 56 by sliding the card through the port 54. The linkage assembly 78 disposes the flip-mirror 82 appropriately and the image of the notecard positioned on the shelf 56 is transmitted to the image plane 46.

With further reference to FIG. 3, the configuration of the depicted image path 49 when the selection element 50 couples image path 49 with the image plane 46, can be explained. The illustrated lens 66, disposed within the image path 49, may compensate for a different length of image path 49 as compared to path 48 and focuses the image data from the object source on the card shelf 56 on to the image plane 46. The fixed mirror 68 is optically coupled to the lens 66 and transmits to the selection element 50. The selection element 50, as illustrated in FIG. 3 disposes the flip-mirror assembly 82 to reflect image data from fixed mirror 68 onto the image plane 46.

The illustrated flip mirror assembly 82 may include a mirror mounting plate 84 and a mirror 86. The mirror 86, can be an ordinary household quality mirror. As illustrated in FIG. 3, the flip mirror 82 may be disposed at an intersection point between the image paths 48 and 49. The reflective surface of mirror 86 faces the reflective surface of the mirror 68 and the non-reflective and non-transmissive surface of plate 84 faces the reflective surface of the steering mirror 64. The flip mirror assembly 82, as illustrated in FIG. 3, transmits image data from object sources on the shelf 56 to the image plane 46 and acts as a shutter for occluding image data transmitted by steering mirror 64.

The assembly flip mirror depicted 82 pivotably mounts to the optical bench 70. As illustrated, the flip mirror 82 can pivot out of optical engagement with image path 48 and optically couple an object source exterior to housing 42 with the image plane 46 while the plate 84 of flip mirror 82 occludes images from card shelf 56. Accordingly, the selection element 50 positions the flip mirror 82 to selectively and alternatively optically couple image paths 48 and 49 to the image plane 46. Although the illustrated embodiment includes lenses and mirrors as optical elements for steering and directing the image data onto the image plane 46, it should be apparent to one of ordinary skill in the art of optics, that other optical elements including transmissive mirrors, prisms and other similar optical elements can be used without departing from the scope of the invention.

In the illustrated embodiment, FIG. 2, the image path 48 has one mirror, the steering mirror 64, disposed within the image path. As a result, the optical conversion element 44 collects a visual mirror-image of the object source. In one optional practice of the present invention, the mirror-image collected by the conversion element 44 is reversed by optically coupling a second mirror within the image path 48. Alternatively, the pylon 12 can preferably include an optical conversion element 44 that has a reverse scan mechanism for acquiring the image data projected onto the image plane 46 in reverse order. The reverse scan mechanism generates data signals representative of the mirror image of the image projected onto the image plane 46. In a further alternative embodiment of the present invention, the data representing the image collected by the conversion element 44 can be reversed by a software routine executed in the host computer 14 such that it presents data in a sequence representative of a non-mirror image of the source. Such software routines are known in the art of computer programming and image acquisition. Other techniques for reversing the image data captured by the conversion element 44 can be practiced with the present invention without departing from the scope thereof.

Fixed mirror 68 can be an ordinary reflective surface of sufficient quality to transmit an image from shelf 56 to the selection element 50. The flatness requirement can be on the order of one wavelength per 2 mm of surface dimension. Thus the mirror 68 can also be of household-quality mirror material cut to the size required to reflect the entire field of view. However, it should be obvious to one of ordinary skill in the art, that other reflective surfaces can be practiced with the present invention without departing from the scope thereof.

In the illustrated embodiment, the optical conversion element 44 is a video camera having a capture lens 80 disposed within the common portion of image paths 48 and 49. The capture lens 80 has a focal length appropriate to the CCD dimensions and field of view required for the specific application. If appropriate, the lens 80 may be a zoom lens. In one preferred embodiment, the lens 80 is a COSMICAR Pentax brand with focal length of approx. 16 mm. Lens 66 is a card capture focus adapter lens. The adapter lens 66 depicted in FIG. 3 is of focal length equal to the lens to card distance and serves as a collimator for the capture lens 80. In one preferred embodiment, the lens 66 is a VITAC brand OPTHMIC lens of focal length 0.25 m (4 diopters) and 73 mm. diameter.

The illustrated optical conversion element 44 is disposed at a spatially fixed position within housing 42 and mounted to sidewall 51 of the housing 42. In the illustrated embodiment the optical conversion element 44 is a video camera of the type suitable for receiving optical images and generating electrical data signals representative of the optical images. In one preferred embodiment, the optical conversion element of 44 is a CCD color camera that generates industry standard video data signals and transmits the data signals via cable 24 to the signal processor 14. One such camera suitable for practice with the present invention is available from the PULNIX Corp. of Sunnyvale Ca. The camera 44 can be a high resolution full color camera having a broad band response for high resolution color applications. The camera can include a shutter having a selectable shutter speed. Shutter speed can be controlled by the signal processor 14. The data signals generated by camera 44 can be NTSC/PAL compatible as well as Y/C(S-VHS) compatible. The camera 44 can also include automatic gain control and auto white-balance. An advantage of the present invention, is that it can acquire images from spatially distributed image sources with a single commercially available, optical conversion element 44 such as a video camera. The single camera design of the data capture pylon 12 reduces costs for constructing such units and the use of a commercially available video camera provides a robust and reliable image acquisition system.

With reference to FIGS. 2 and 3, one example of a selection element 50 constructed according to the present invention for use in the data collection system 10 can be described. As illustrated in FIGS. 2 and 3, the selection element 50 includes a flip mirror assembly 82 with a mirror 86 mounted to a plate 84 which is pivotably mounted to housing 42 by a mounting shaft 88. As illustrated by FIGS. 2 and 3, the shaft 88 rotates between a first and second position. As further illustrated, the shaft 88 pivots the mirror 86 into and out of optical engagement with the image plane 46.

Figure 4:
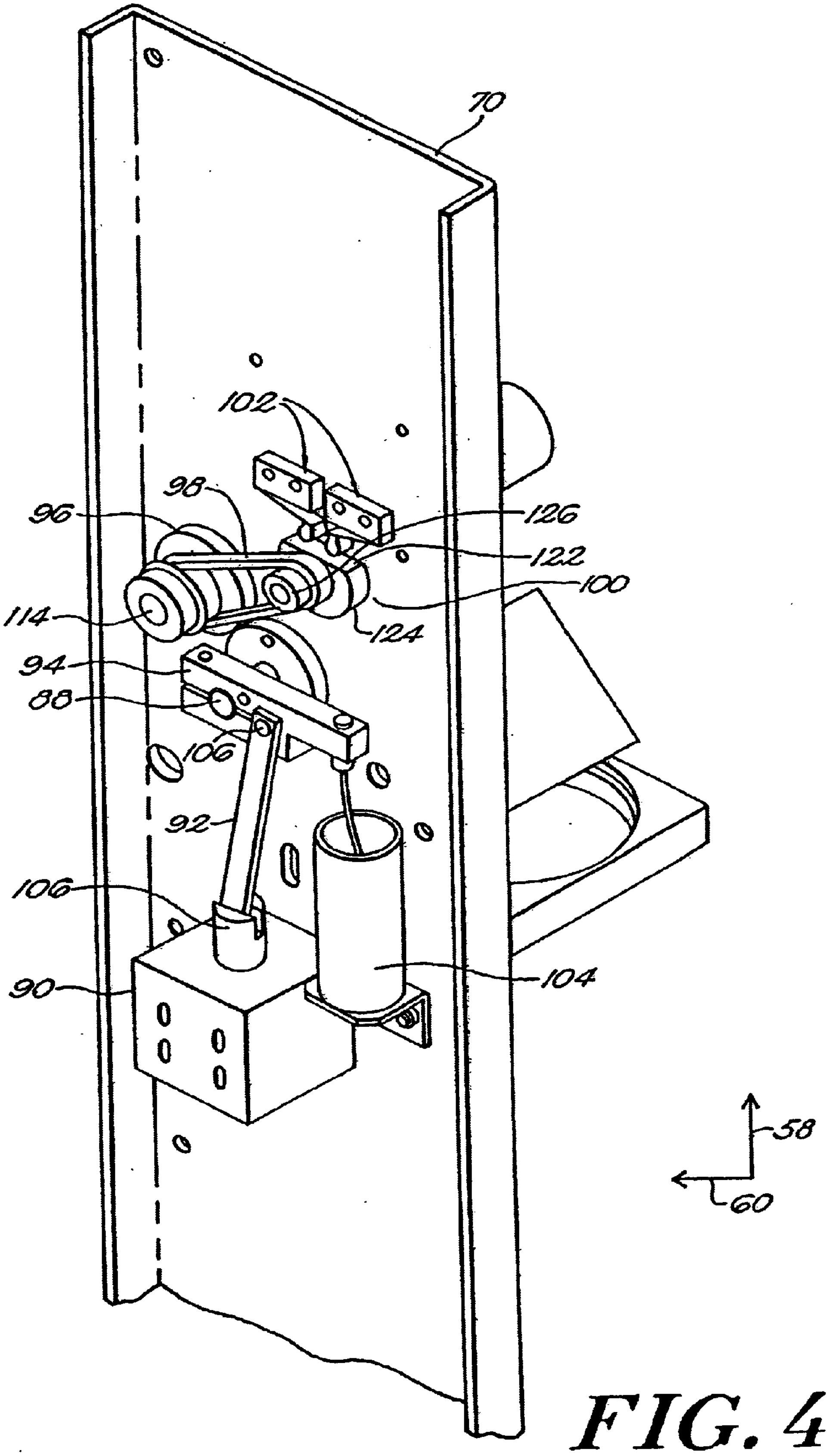
FIG. 4 is a schematic diagram of one mechanism for selecting and adjusting optical paths that project onto an image plane.

FIG. 4 illustrates an alternative perspective of the selection element 50. FIG. 4 shows a side view of the selection element 50 that includes a solenoid 90, a mechanical link arm 92, a crank arm 94, and the shaft 88.

The depicted solenoid 90, connects to the link arm 92 by a pivot pin 106 that extends through a mounting portion of the solenoid 90 and the link arm 92. The link arm 92 is free to pivot about pin 106 in a direction transverse to the linear mechanical action of the solenoid 90. The other end of the link arm 92 connects by a second pivot pin 106 to the crank arm 94. The crank arm 94 can pivot about the pivot pin 106 in a motion transverse to the longitudinal axis of the link arm 92. The crank arm 94 is further fixedly connected to the shaft 88 that extends through optical bench 70. In FIG. 4, the axis 58 is directed along the longitudinal direction of optical bench 70 and the axis 60 is directed along the latitudinal axis of the optical bench 70. Accordingly, mechanical action of the solenoid 90, acting relative to the axis 58, moves link arm 92 relative to axes 58 and 60. Link arm 92 moves crank arm 94 which rotates the shaft 88 that is rotatably mounted through the bench 70. Therefore, the link arm 92, crank arm 94, and shaft 88 assembly act to translate the linear mechanical action of the solenoid 90 into a rotational action for pivoting the mirror mounting plate 84 between a first and second position corresponding to a first and second condition of the solenoid 90.

For the selection element 50 depicted in FIG. 4, the solenoid 90 can be any linear solenoid of the type that linearly actuates an element responsive to a control signal. In one preferred embodiment of the selection element 50, the solenoid 90 is a 12 volt dc 680 mA linear solenoid having a core element that linearly mechanically actuates responsive to an electrical control signal.

With reference again to FIG. 2, the structure of an optional steering mirror 64 can be described. As illustrated, the steering mirror 64 includes a reflective surface 110, a carrying plate 112, and a shaft 114 that extends through the optical bench 70. In one embodiment of the steering mirror 64, the mirror 110 is adhesively bonded to the plate 112. The plate 112 is fixedly mounted to the shaft 114, the shaft 114 extends through the bench 70 and is rotatably attached to the bench 70. A motor assembly 108 attached to bench 70 drives the steering mirror 64 for adjusting the image path 48.

Figure 5:
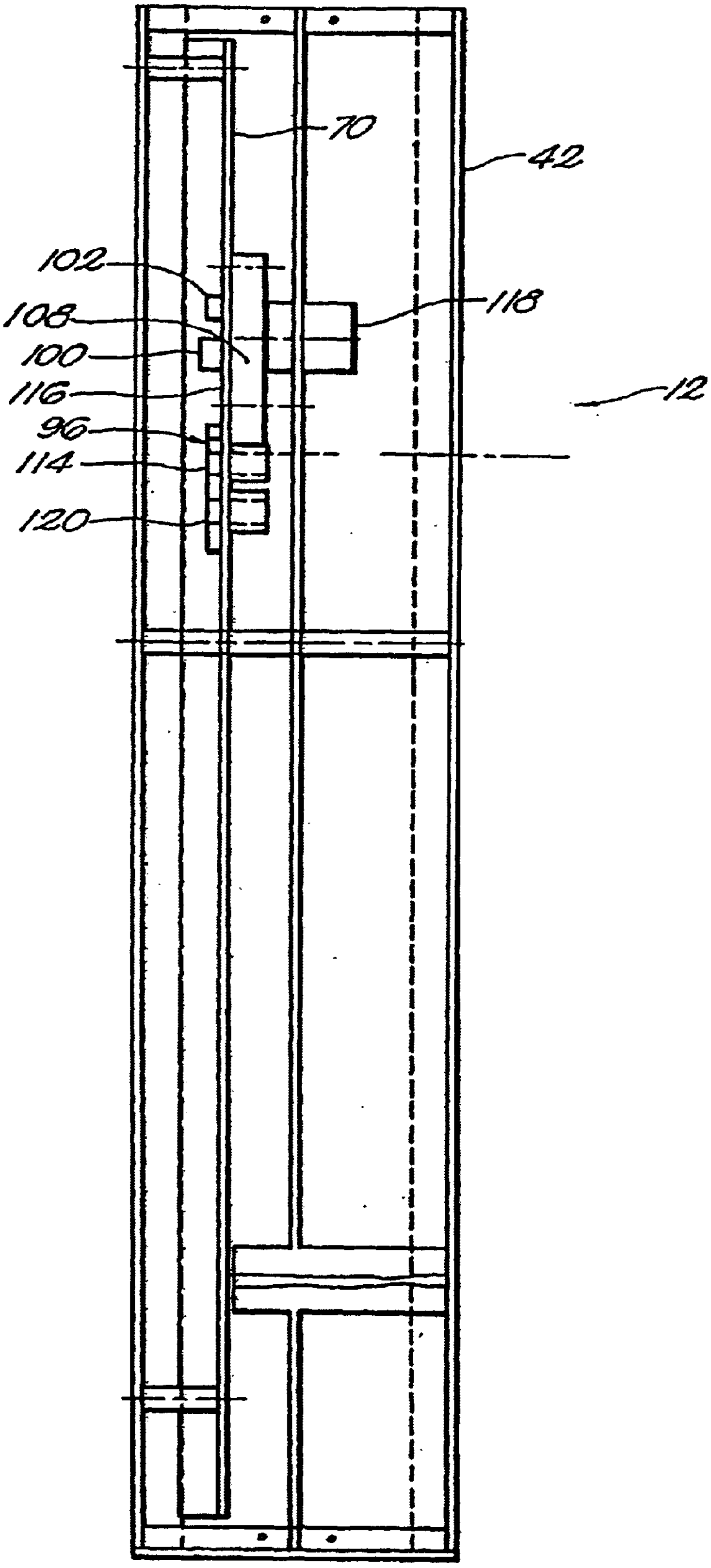
FIG. 5 is a schematic diagram with a side perspective of the mechanism for selecting and adjusting optical paths depicted in FIG. 1.

With reference to FIGS. 4 and 5, the mechanical assembly of the depicted steering mirror 64 can be described. The steering mirror assembly includes a sprocket 96, timing belt 98, a cam 100, two microswitches 102 and the motor assembly 108.

The motor assembly 108 includes a gear box 116 and a motor 118. As can be seen in FIG. 5 the depicted gear box 116 couples to the shaft 114 that extends through the optical bench 70. The shaft 114 that extends into the gear box 116 is mechanically connected to a gear assembly housed within the gear box 116. The motor 118 connects to the gear box 116 and has a shaft (not shown) that extends into the gear box 116 and mechanically engages with the gear assembly therein. Sprocket 96 connects with the shaft 114 that extends into the gear box assembly 116 and mechanically engages with the gear assembly therein. Responsive to rotational force applied by the motor 118 to the gear assembly, the drive shaft 114 rotates and drives the sprocket 96. The motor 118 can be driven in either a clockwise or counterclockwise direction, to selectably rotate sprocket 96.

With reference again to FIG. 4, the depicted steering mirror 64 includes a timing belt 98 that connects between the sprocket 96 and an arbor portion of the cam 100. Responsive to the rotation of the sprocket 96, the timing belt 98 rotates cam 100. FIG. 4 illustrates the cam 100 in mechanical contact with the two microswitches 102. As illustrated, the cam 100 can include a flat surface 122. In FIG. 4 the flat surface 122 is in contact with the contact arms of the two limit switches 102. In operation the motor 118 through the generator 116 rotates the sprocket 96 which rotates the cam 100. The flat surface 122 of cam 100 rotates toward one of the contact arms of limit switches 102 and depresses the contact arm of the switch 102 to place the switch 102 in a second condition. Cam 100 connects to a shaft 126 that extends through the bench 70. The shaft 126 rotatably connects cam 100 to the bench 70 so that the cam 100 can rotate responsive to the rotation of the motor 118. The illustrated limit switches 102 may be connected in circuit to the remote pylon controller 34. The condition of the limit switches 102 indicates the relative position of the steering mirror 64, between a first and second position. In one embodiment of the invention, the limit switches 102 are connected in series circuit with the power supply circuit that provides power to the motor 118. The limit switches 102 are wired as normally closed switches. The cam 100 can depress the contact arm of the limit switch 102, to open the motor power supply circuit and prevent the steering mirror 64 from rotating further. Therefore, the illustrated assembly illustrated in FIG. 4 operates in essentially open loop with stop sensors limit switches 102 to adjust the position of the steering mirror 64 between two positions. Typically, this embodiment of the invention is practiced with a host computer that includes the optional monitor 16 and optional keyboard 18, so that an operator 30 can monitor the image data acquired along image path 48, with the steering mirror 64.

The operator enters commands at the keyboard 18 to generate command signals that cause the host pylon controller 36 transmits via cable 26 to the remote controller 34. The host controller 34 responds to the command signals and activates the motor 118 to rotate the mirror 64. In one embodiment of the present invention, the host controller 36 is a digital input/output card of the type suitable for generating digital electrical data signals. In one example, where the host computer 14 is a DOS based personal computer, such as the type manufactured by the IBM Corporation, the host controller 36 can be an 8-bit digital input/output card such as the type sold by Real Time Devices of State College, Pennsylvania. The remote pylon controller can be any motor control circuit suitable for driving the motor 108, and can be any power relay circuit suitable for driving the solenoid 90 and that preferably can respond to digital data signals.

FIG. 2 depicts an optional feature of the invention for image selection. The optional illumination elements 130 and 132 disposed within housing 42 illuminate selectively and alternatively the object sources. The illumination elements 130 and 132 are in electrical circuit with the remote pylon controller 34. In this embodiment of the present invention, the remote pylon controller 34 may include illumination control circuitry for powering and controlling. illumination elements, such as elements 130 and 132. Typically, this control circuitry may include power supplies of suitable size to power a flash illuminator or a strobe light, and can include a computer controlled relay circuit for activating the illumination elements 130 and 132 responsive to a command signal received from the host controller unit 36 via control cable 26. Illumination control circuits suitable for generating an illuminating flash, or a series of flashes are well known in the are of photography and image acquisition, and any suitable illumination control circuit that can alternatively and selectively control one or more illumination elements can be practiced with the present invention without departing from the scope thereof. With this feature selective imaging of different object sources can be coupled to the image plane along optical path 49, leaving the flip mirror 82 in one position.

The illumination element 130 disposed in the upper portion of housing 42 illuminates an object source positioned exterior to the housing 42, such as a customer applying for a driver's license. In one preferred embodiment of the present invention, the illumination element 130 is a strobe light that illuminates an object source responsive to a control signal received from the host computer 14. The host computer 14 can synchronize the strobe light 130 to the acquisition of an image by the optical conversion element 44, by detecting when the steering element 50 connects image path 48 to the projection plane 46. The illustrated illumination element 132 connects within the housing 42 above shelf 56, and illuminates the shelf 56 for acquiring an image from an object source disposed on the shelf 56. The signature card light 132 can illuminate an object source when the selection element 50 optically couples the image path 49 to the image projection plane 46.

In the illustrated embodiment of the present invention, the signature card illumination light 132 is a strobe light that illuminates an object source positioned on the shelf 56 responsive to a control signal generated by the host computer 14. The signature card light 132 and portrait capture light 130 can be activated by a keyboard command entered by the operator 30. The command may be entered when the operator 30 verifies by looking at the live video display 16 that the correct image is being captured. (Signature right side up; customer looking at camera, etc.). At the keystroke, the flash for the object selected (portrait or signature) is enabled, and at the next vertical synchronization pulse from the videocamera 44, the flash is triggered and the next frame of video is acquired by the frame grabber 38. The keystroke may be asynchronous; an analog timing circuit may cause the flash to occur within a narrow timing window within the camera vertical blanking interval.

The type of illumination elements depend primarily on the application of the data collection system 10. In particular, however, an illumination element such as element 130 that illuminates an image source exterior to housing 42 should be sufficiently strong to overcome the ambient light illuminating the image source. By providing an illumination element, such as 130, that is strong enough to overcome ambient light, a more uniform image acquisition procedure is achieved. For example, the mixture of standard incandescent or fluorescent lights with daylight varies with location, season, time of day, and even the presence of people proximate to the image source and wearing bright clothing. In order to acquire image data that is consistent over the change of seasons and the change in time of day, an illumination source should be provided that is substantially greater than the ambient light. The selection of such lighting sources are well known in the art of photography. In the illustrated embodiment, the illumination element 130 is a strobe light for providing flash illumination in a series of two flashes timed with the acquisition of an image by the interlaced video camera 44. A first flash illuminates the object while one of the interlaced fields is acquired, and a second subsequent flash, synchronized to the vertical synch pulse of the camera 44, captures the second field of the interlaced image data.

In alternative embodiments of the present invention, the illumination element 130 can be a steady state light brighter than the ambient lighting. Additionally, the data capture pylon 12 can be employed in conjunction with an enclosure that surrounds the image source which is exterior to the housing 42. The enclosure may block ambient light and suppress light reflection within the enclosure to provide a more uniform light condition. The more uniform lighting condition creates greater consistency between captured portrait images. The greater consistency between captured images and makes it more difficult to produce a forged identification card and more easy to detect forgeries.

Figure 6:
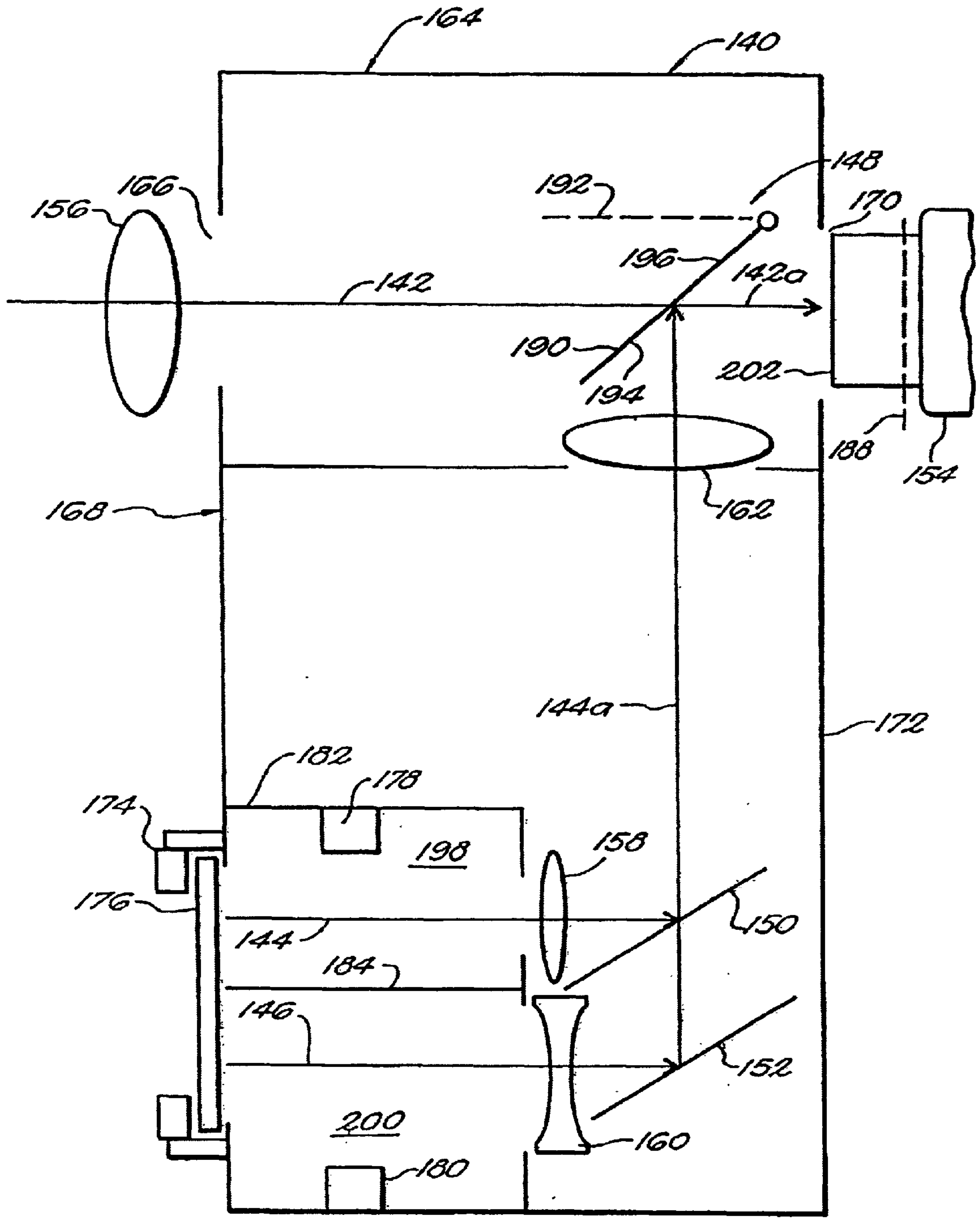
FIG. 6 is a schematic diagram of an alternative embodiment of a data capture pylon constructed according to the present invention.

With reference to FIG. 6, another alternative embodiment of the present invention can be described. FIG. 6 illustrates an image capture pylon 140 that includes an image path 142, an image path 144, an image path 146, a flip mirror 148, a partially transmissive mirror 150, a reflecting mirror 152, an image focus adapter lens 156, and focus adapter lenses 158, 160 and 162. These elements are disposed within a housing 164 that includes a portrait capture port 166 in a sidewall 168 and a camera port 170 and sidewall 172. A card shelf 174 is mounted on the exterior of sidewall 168 and holds a notecard 176. Illumination elements 178 and 180 are positioned within chamber 182. A baffle 184 separates to the chamber 182 into two distinct compartments 198 and 200, each of which may view a data field on the note card 176.

As illustrated in FIG. 6, this embodiment of the present invention includes three image paths 142, 144 and 146 that optically couple spatially-distributed object sources to an image plane 188 that is coincident with a CCD element in the optical conversion element depicted as the camera 154. Image paths 144 and 146 share a common portion 144*a*, and paths 144, 146 and 142 share a common portion 142*a*. The camera 154, is positioned exterior to the housing 164 and may be mounted to the sidewall 172. The flip mirror 148, and illumination elements 178 and 180 form a selection means that can selectively and alternatively couple one of the spatially-distributed object sources to the image plane 188. The capture lens 202 is disposed within the image paths 142, 144 and 146, and images the selected object source onto the image plane 188.

The flip mirror 148 may be pivotably mounted to the housing 164. The flip mirror 148 can pivot between the first and second position, illustrated in FIG. 6 by the solid line and the dashed line 190 and 192, respectively. The flip mirror 148 can include a reflective surface 194 and a non-reflective surface 196. In FIG. 6, the flip mirror 148 is disposed at position 190 for optically coupling an object source at shelf 174, such as the notecard 176, to the image projection plane 188. As illustrated, the flip mirror 148 angularly disposes the reflective surface 194 into the image path 144*a* to couple optically one of image paths 144 or 146 to the camera 154. Similarly, the non-reflective surface 196 is disposed within the image path 142 for occluding image data transmitted through port 166. The flip mirror 148 can be mechanically connected to a solenoid mechanical assembly, such as the one previously described, that can pivot mirror 148 into the second position 192. As illustrated in FIG. 6 by dashed line 192, the non-reflective surface 196 is pivoted out of optical engagement with image path 142 and the image data transmitted along image path 142 is optically transmitted to the image projection plane 188. Similarly, the reflective surface 194 is pivoted out of optical engagement with the image plane 188 to disengage optically image path 144*a* from the image plane 188.

The illumination elements 178 and 180 can act in concert with baffle 184 for connecting one of the image paths 144 or 146 to the image plane 188. In the illustrated embodiment, the baffle 184 occludes light from the illuminating element 178 from coupling to the optical path 146 and occludes light from the illuminating element 180 from coupling to optical path 144. Image path 146 optically couples lens 160, reflective mirror 152, partially transmissive mirror 150, lens 162, the flip mirror 148, and capture lens 202 to the image plane 188. As further illustrated in FIG. 6, the chamber 182 includes illumination elements 178 and 180 each mounted within chamber 182 for illuminating one portion of the card 176.

As illustrated in FIG. 6, the illumination element 180 is positioned in the lower-most portion of compartment 200. Illumination element 180 can be in electrical circuit with remote controller 34 and activated by a command signal from the remote controller 34 to illuminate the lower portion of the notecard 176 to optically couple the lower portion of notecard 176 with the image plane 188. Alternatively, the illumination element 178 that can also be in circuit with controller 34 can be activated to illuminate the upper portion of notecard 176 and optically couple the upper portion of the notecard to the image plane 188. The illumination elements 178 and 180 are selectively activated to optically couple image data from the selected portion of notecard 176 to the image plane 188.

The notecard 176 in the illustrated embodiment, reflects light from the illumination elements 178 and 180 to generate image data for transmission to the image plane 188. However, in an alternative embodiment, the notecard 176 can be of transmissive material and the illumination elements can be mounted within shelf 174 and disposed behind the notecard so that the notecard 176 sits between the illumination elements and the chamber 182. By activating the illumination elements mounted behind the notecard 176, image data can be transmitted from the notecard 176 via the image paths to the image plane 188. Other techniques for transmitting image data from an object source can be practiced with the present invention including using illumination elements of different wavelengths to activate portions of the data on the notecard 176, with selected spectral sensitivity, without departing from the scope of the invention.

Typically, the content of the notecard 176 is a signature, text, bar code, printed image, conventional ink fingerprint or an image relayed from another optical device such as a real-time optical fingerprint device. Other types of image data can be printed on notecard 176 or transmitted through an optical panel, such as an LCD display panel, placed within shelf 174, without departing from the scope of the invention described herein.

In the illustrated embodiment of FIG. 6, the selection element for selecting the field of view includes the illumination elements 178 and 180, the baffle 184 and the flip mirror 148. Other elements for selecting the field of view may include shutters, steering mirrors, prisms, polygon mirrors, polygon shutters, electro-optical light valves, polarization filters, spectral filtering devices, spectral selectivity devices, fade-out printing inks, and other field of view selection techniques known in the art of optics. These other field of view selection techniques can be practiced with the present invention without departing from the scope thereof.

As previously described with reference to FIGS. 2 through 5, the different lengths of image paths 142, 144 and 146 can be compensated for by disposing an adjustable lens within the image paths 142, 144 and 146. In one embodiment, the camera 154 includes an adjustable lens 202 mounted to the camera and disposed in the image paths. The adjustable lens can be a zoom lens of the type commonly used for adjusting the field of view. The adjustable lens 202 can be mechanically controlled responsive to the operating conditions of flip mirror 148. The pylon remote controller 34 can be in electrical circuit with sensor elements, such as the limit switches 102, to detect the position of the flip mirror 148, to detect the position of the flip mirror 148, and therefore, which object source is optically coupled to the image plane 188. The processor 12 can determine and adjust the proper focus for lens 202 accordingly. Further, the lens adjustment mechanism can be automatically controlled according to the relative range of the object source to select the proper focus for the image path. Such automatic focusing systems are known in the art of photography and include infra-red and ultra-sonic ranging sensors.

Alternatively, the focal lengths for image paths 142, 144 and 146 can be independently compensated for by providing adjustable lenses for focus adapter lenses 156, 158, 160 and 162. Other systems for adjusting the focal length of the image paths 142, 144 and 146 are known in the art of optics and photography and can be practiced with the present invention without departing from the scope thereof. Furthermore, other techniques for obtaining the proper focus of an image onto the image plane can be practiced with the present invention, including selecting lenses with a depth of focus sufficiently large to accommodate image sources positioned within a range of distances.

Figure 7:
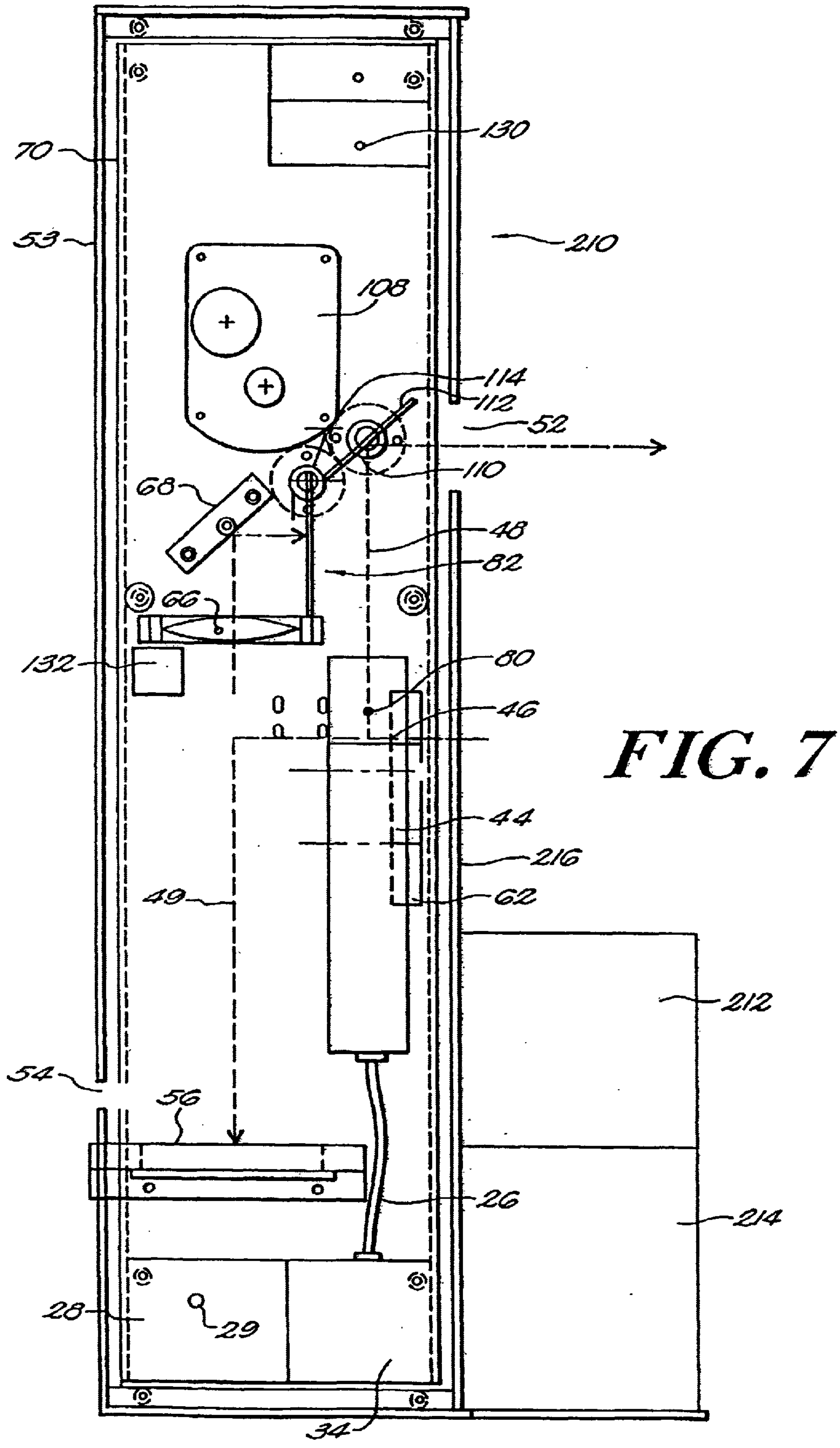
FIG. 7 is a schematic diagram of an alternative embodiment of a data capture pylon that includes an optional barcode unit and an optional magnetic stripe unit.

A further embodiment of the present invention is illustrated in FIG. 7. FIG. 7 illustrates a data capture pylon 210 that includes a bar code unit 212 and a magnetic stripe unit 214. The illustrated bar code unit 212 and magnetic stripe unit 214 are mounted to the housing 216 of the image capture pylon 210. In other embodiments, the bar code unit 212 and the magnetic stripe unit 214 can be housed separately from the pylon housing 164 or be detachably mounted for selective interconnection with the data collection system. In the illustrated embodiment, the bar code unit 212 can be a unit for writing data onto magnetic stripes that can be incorporated onto identification cards. The data may be generated by the host computer 14 as digital signals and downloaded into a memory in the magnetic stripe unit 214. Alternatively, the magnetic stripe unit 214 may read data from a magnetic stripe and download the data as digital signals to the host computer 14. One magnetic stripe unit that can read and write data and that is suitable for practice with the present invention is a magnetic stripe 214 of the type sold by Magnicode and can include Magnicode model 71XHC. Other magnetic stripe units can be practiced with the present invention without departing from the scope thereof.

The bar code unit 212 can be a bar code reader unit for reading bar code data and for generating data signals representative of the bar code data. The bar code data can be read and downloaded data to the host computer 14 via data cable 24 for processing by the host computer 14. The bar code reader unit 212 can be a slot reader or a pen-type reader and can be of the type manufactured by the SAHO Corporation including models S-200, S-100 and other models.

Other data acquisition units can be incorporated into the housing including fingerprint readers for acquiring data images of fingerprints. Fingerprint readers suitable for practice with the present invention include fingerprint readers manufactured by the Identix Corporation, such as Identix Touch View television 555. The fingerprint unit can generate electrical data signals representative of the fingerprint acquired and transmit the data signals to the host computer 14 via cable 24 for integration onto a printed identification card.

The barcode unit 212, the magnetic stripe unit 214, can generate output signals representative of the collected data. The units can have an output connectors connected in circuit to the signal processor 12 for transmitting the encoded data to the signal processor 12. The signal processor 12 can have data acquisition circuits for acquiring the collected data. These data acquisition circuits are well known in the art of computer engineering, and any of the data acquisition circuit suitable for receiving and storing data of the type generated by the above-described data collection units can be practiced with the present invention.

Figure 8:
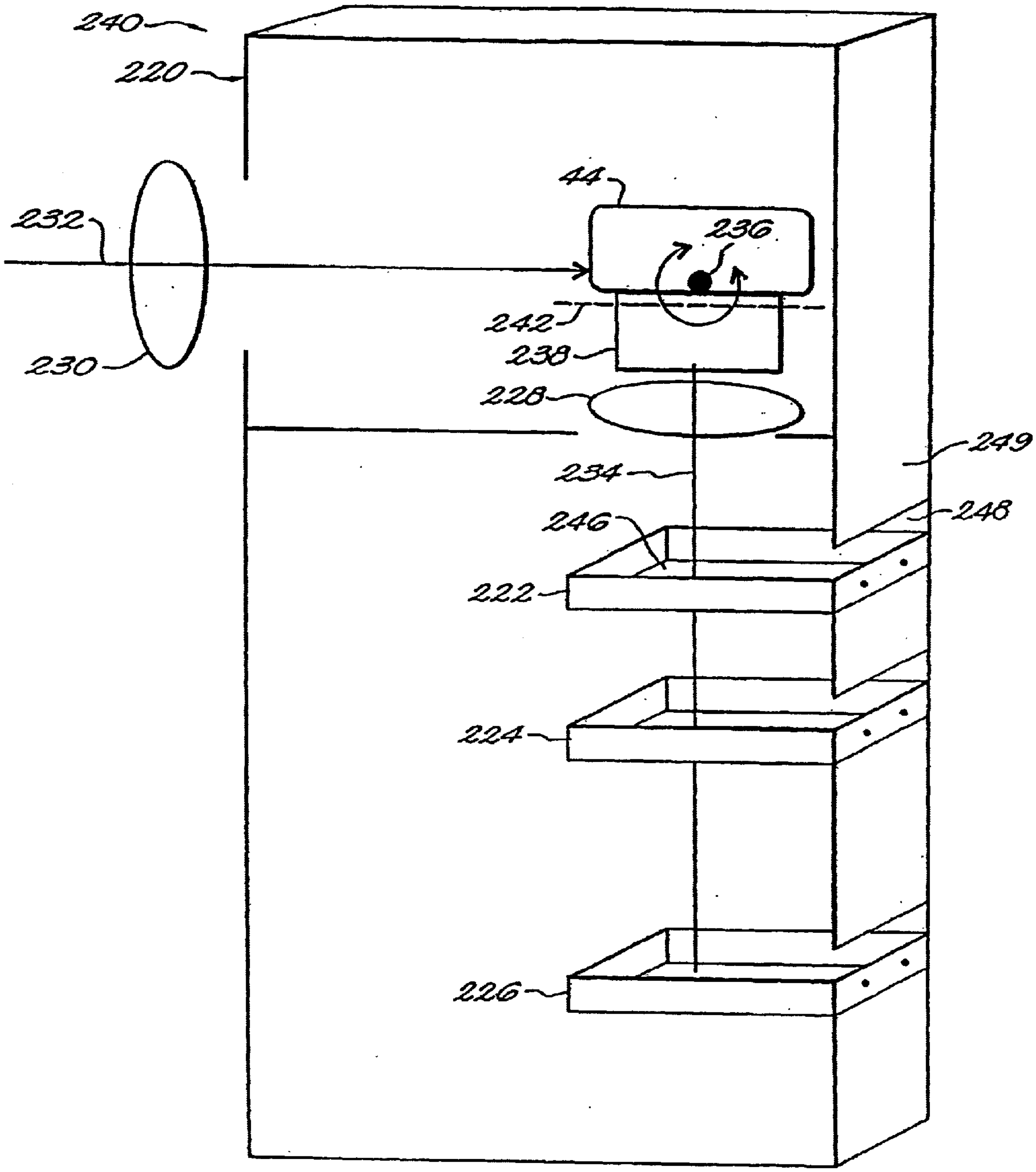
FIG. 8 is a schematic diagram of an alternative embodiment of a data capture pylon that includes an optical conversion element pivotably mounted to the unit housing.

FIG. 8 illustrates a further alternative system 240 according to the present invention that includes an image plane 242 that is coincident with the CCD element of a video camera that is rotatably mounted to the housing 220. In this alternative embodiment, the image plane 242 moves when the optical conversion element 44 is rotated about a spatially fixed point within the housing 220. The image plane 242 rotatably mounted within housing 220 can be rotated between a first position within the housing 220 and a second position within the housing 220. In the first position within the housing 220 the image plane 242 can be disposed within a first image path for acquiring video images from a first object source. The rotatably mounted image plane 242 can rotate to a second position within a second image path for acquiring visual images for a second object source.

The system 240 further includes an upper card shelf 222, a middle card shelf 224 and a lower card shelf 226, a focus adapter lens 228, a focus adapter lens 230, an image path 232, an image path 234 and a shaft 236 that mounts the optical conversion element 44 to the housing 240.

FIG. 8 schematically illustrates that the optical conversion element 44, depicted in FIG. 8 as a videocamera having an image capture lens 238, mounts on shaft 236 to housing 240 and can be pivoted into optical engagement with either the image path 232 or the image path 234. The image path 232 optically couples object sources located exterior housing 220 to the image plane 242 when the optical conversion element 44 is rotated so that the image plane 242 is disposed within the optical path 232. FIG. 8 depicts the optical conversion element 44 rotated into optical engagement with the image path 234 that transmits image data from the shelves 222, 224 and 226 through the lens 228 and through the lens 238 and projects the image data onto the image plane 242 that, in the illustrated embodiment, is coincidence with a CCD element and the videocamera 44.

The shelves 222, 224 and 226 are mounted to the sidewall 244 and spaced apart from each other at selected distances along the wall 244. The shelf 222 as illustrated in FIG. 8 can be frame that bolts to sidewall 244 and has an open passage 246 through which the image path 234 extends. FIG. 8 further illustrates that a slot 248 extending through sidewall 244 is disposed proximate to shelf 222 and dimensioned so that an object such as a 3×5 notecard can be inserted through the slot 248 and placed on the frame of card shelf 222 so that the notecard is disposed within the optical path 234.

The location of the shelves 222, 224 and 226 along the image path 234 are selected to achieve the desired resolution for the object sources placed on the shelves. The shelf 222 that is located closest to the image plane 242 would provide the highest resolution for object sources placed on the shelves 222, 224 and 226. For example, the shelf 222 could be disposed within the image path 234 to provide a resolution of 300 dpi for object sources, such as barcodes, positioned on the shelf 222 within the image path 234. Similarly, the shelf 224 could be spaced from the image plane 242 to achieve a resolution of 200 dpi for object sources that require less resolution during the processing of image data by the signal processor 14. Further, the card shelf 226 could be disposed within the image path 234 to provide a resolution on the image plane 242 of 100 dpi, a resolution suitable for imaging information such as text or fingerprint images.

FIG. 8 illustrates that an embodiment of the present invention can be constructed to have a optical conversion element 44 that can be rotated into separate image paths, such as paths 232 and 234 so that image data from spatially separated object sources can be collected by the optical conversion element 44. FIG. 8 illustrates that this embodiment of the present invention may reduce the number of optical elements employed for selecting which image path couples to the image plane 242. FIG. 8 further illustrates that object sources can be located at select points along an image path to project images onto image plane 242 with a select resolution.

In practice, object sources can be manually positioned on the shelves 222, 224 and 226 during the collection of data by system 240. However, it should be obvious to one of ordinary skill in the art of mechanical and electrical engineering that the object sources, such as notecards, can be automatically fed at different times and in a select sequence onto the shelves 222, 224 and 226 to collect data from the object sources positioned onto the shelves in a sequence that is synchronized to the acquisition of images by the optical conversion element 44. These automated systems for locating object sources onto the shelves are well known in the art and practice of these systems does not depart from the scope of the invention described herein.

Figure 9:
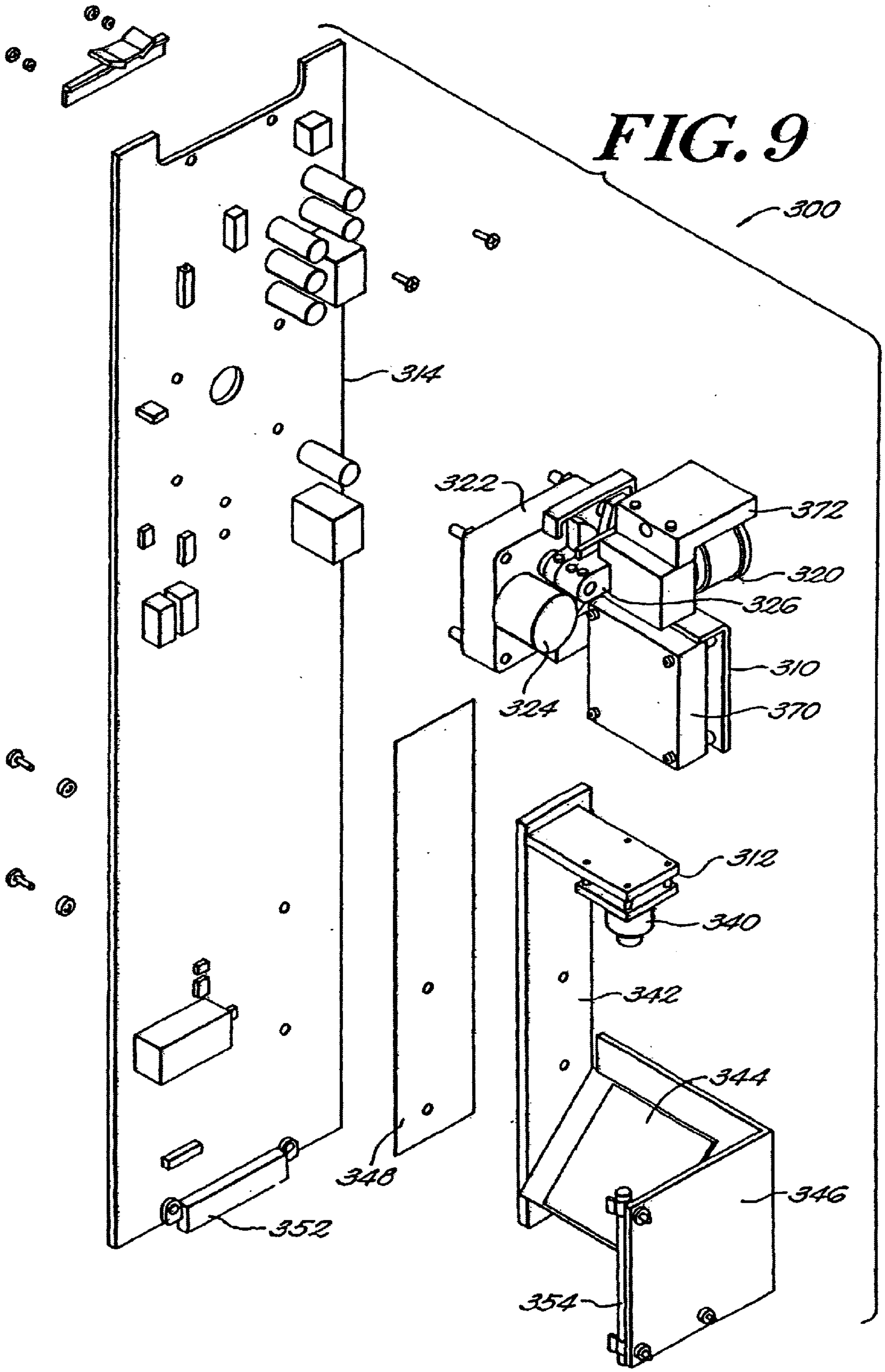
FIGS. 9 and 10 illustrate perspective views of an alternative embodiment of a data capture pylon constructed according to the invention; and, FIG. 11 illustrates an expanded schematic view of a pivoting optical assembly for use with a data capture pylon constructed according to the invention.
Figure 10:
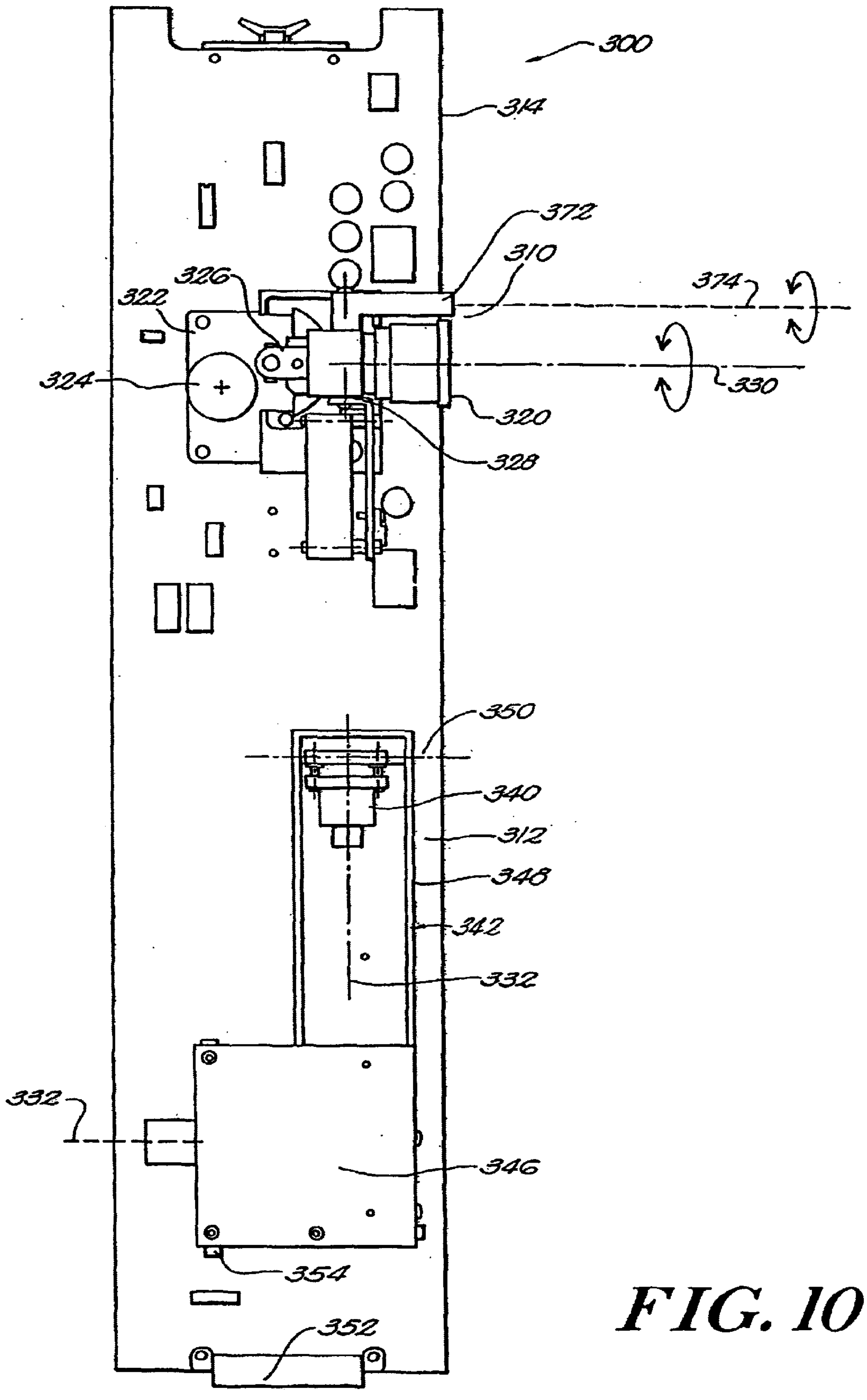
Figure 11:
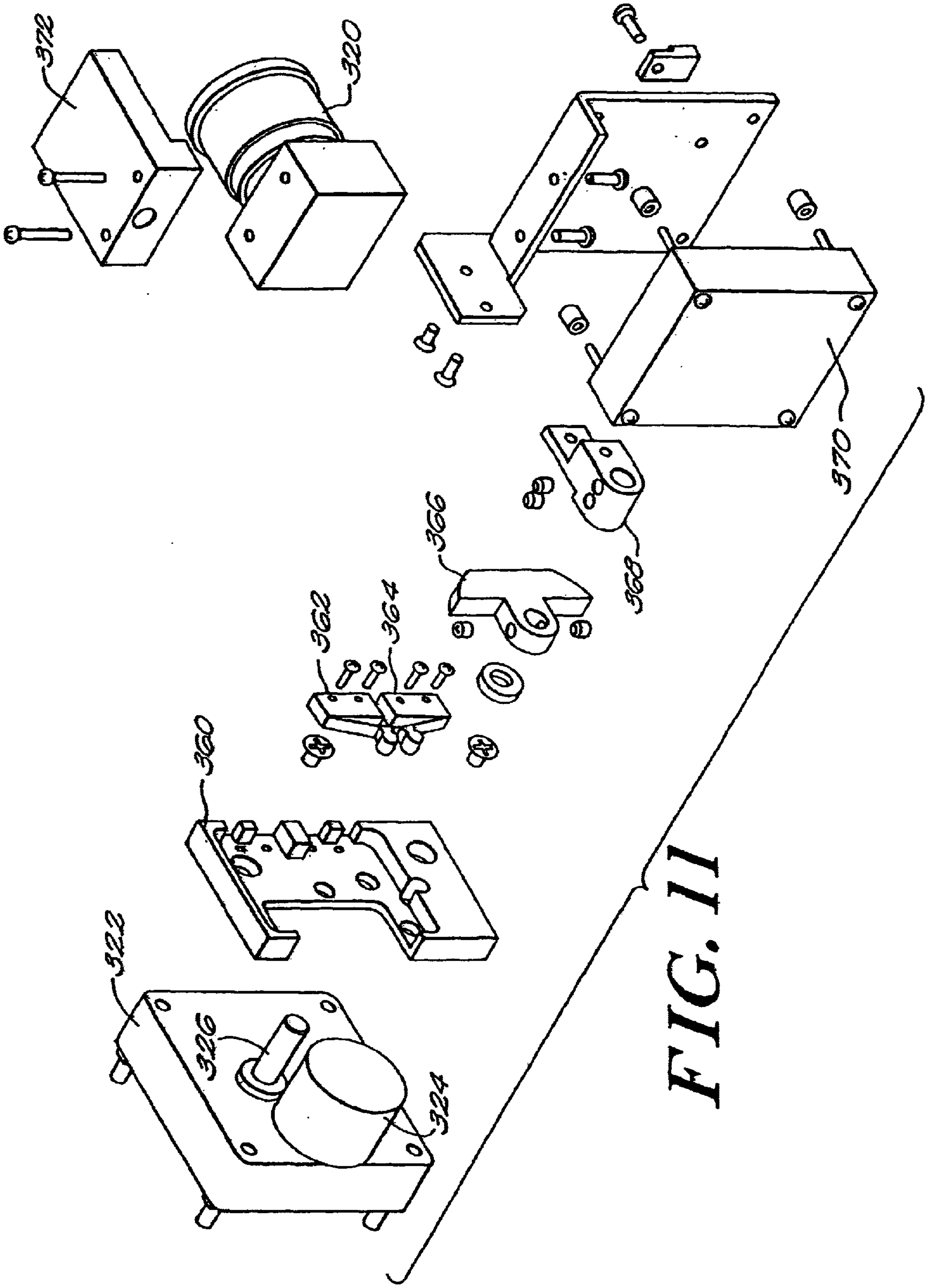

With reference to FIGS. 9, 10 and 11 a further alternative embodiment of a data capture pylon 12 constructed according to the present invention for acquiring data for multiple sources is depicted. In particular, FIG. 9 illustrates the pylon assembly 300 which fits inside the data capture pylon housing 42. The pylon assembly 300 includes an upper optical assembly 310, a lower optical assembly 312 and an optical bench 314 to which both of these assemblies mount. In this embodiment, the data capture pylon functions as a remote controllable image pylon that can employ plural acquisition elements for automatically and controllably collecting images from multiple sources.

The upper optical assembly 310 includes an image acquisition element 320, depicted in FIG. 9 as a camera element connected to the camera electronics 370, a gearmotor assembly 322 having an electric motor 324, a shaft assembly 326 and a spot photometer 372.

The lower optical assembly 312 includes an image acquisition element 340, an optical bench 342, a mirror 344, a screen 346, a spacing element 348 and an illumination element 354.

The optical bench 314 illustrated in FIG. 9 is an electrical circuit card assembly that is adapted for both supporting the optical assemblies 310 and 312 and for acting as a control and power supply circuit card that operates the gearmotor assembly 322 and interfaces with the spot photometer. To this end, the optical bench 314 includes an electrical connector element 352 that allows the optical bench 314 to connect to the host computer 14 in order that the host computer 14 can remotely control the operation of the image acquisition elements.

FIG. 10 provides a side perspective of the pylon assembly 300, and depicts the upper and lower optical assemblies 310 and 312 as mounted to the optical bench 314. As illustrated in FIG. 10, this embodiment of the data capture pylon 12 has two optical axes, 330 and 332 for collecting images from physically separate image sources onto physically separate image planes 328 and 350. As shown in FIG. 10, the first image path 330 optically couples to the image plane 328 which is typically coincident with a CCD element in the optical conversion element 320.

As depicted by FIG. 10, the optical axis 330 which couples an image source onto the image plane 328 is adjustable by the pylon assembly 300, and in particular is pivotable by action of the gearmotor assembly 322. In one operation, a system operator working at the host computer 14 pivots the image acquisition element 320 to incline the image acquisition element 320 according to the height of an applicant in order that the applicant's face, or any other image source, is properly within the field of view of the image acquisition element 320. Similarly, the upper optical assembly 310 can be operated to pivot between a first position and a second position to capture images from image sources located at physically separate locations. For example, an operator can operate the optical assembly 310 to capture, at one inclination, an image of an applicant's face and to capture at a second inclination, an image of a data card positioned below the applicant's face and displaying demographic data. As previously described, the image acquisition element 320 can include an adjustable lens element, or a series of lens elements for adjusting the focus along diverse image paths. A selection element can pivot the assembly between the first and second inclinations, or positions, for capturing images from the plural image sources. Accordingly, in a further alternative embodiment, the optical assembly 310 can be the sole optical assembly in the data capture pylon, such as the system 240 depicted in FIG. 8.

As further illustrated by FIG. 10, the upper optical assembly 310 has a spot photometer 372 which is positioned above the image acquisition element 320 and collects light along the optical path 374 which is close to and parallel with the optical path 330 of the image acquisition element 320. The optional spot photometer 372 measures light levels to determine how brightly or darkly illuminated the image source is. The spot photometer 372, which is fixedly connected to the image acquisition element 320 in order that it pivots with the image acquisition element, is electrically connected with the optical bench 314 to provide signals thereto. The signals generated by the spot photometer 372 can be used for controlling an iris or shutter speed of the image acquisition element in order to adjust some image acquisition characteristic of the image acquisition element 320 in order that images which are captured by the image acquisition element 320 have a uniform light intensity.

FIG. 11 depicts in more detail the upper optical assembly depicted in FIGS. 9 and 10, which represent one embodiment of an optical assembly practicable with the invention. FIG. 11 depicts a pivotable, and accordingly optically steerable, optical assembly that includes the gear motor assembly 322 having a motor 324, a shaft 326, a switch housing 360, upper and lower limit switches 362 and 364, cam element 366, connector element 368, image acquisition element 320, a camera electronic assembly element 370 and the spot photometer 372. As depicted by FIG. 11, the optical assembly 310 provides a pivotable image acquisition assembly. In particular, the illustrated optical assembly 310 includes the shaft element 326 which rotates responsive to the action of the motor element 324. To provide a pivoting motion, a limit switch assembly is connected to the shaft element 326 to limit the arc of rotation of shaft assembly 326 between a maximum and a minimum inclination.

In particular, as shown by FIG. 11, the switch housing 360 mounts via conventional mechanical assemblies, such as screws, to the gear motor assembly 322 and is adapted to receive the upper and lower limit switches 362 and 364 respectively. The cam element 366 mounts to the shaft 326 and can be held by any conventional mechanical means, such as a threaded screw. As illustrated by FIG. 11, the cam element rotates in response to the location of the shaft element 326. The upper and lower limit switches 362 and 364 which are mounted to the switch housing 360 are depressed or released by action of the cam 366. The limit switches 362 and 364 are connected in an electrical circuit in order that the condition, i.e., either opened or closed, of the limit switch can be communicated to the host computer 14 which operates the system. In this way, the host computer 14 can detect whether the shaft 326 has rotated the camera assembly to an upper or lower extreme position. Accordingly, the host computer 14 can detect when the camera element 320 is inclined to a known position, and can deactivate the motor 324 to prevent further pivoting of the image acquisition element 320.

In operation, the image acquisition element 320 can be active during the optical steering process in order that a system operator can determine when an image source is optically coupled to the image plain 328 of the image acquisition element 320. In the embodiment depicted in FIG. 11, the gearmotor assembly 322 provides one degree of movement by pivoting the image acquisition element 320 about an axis extending through the shaft 326. It shall be apparent to one of ordinary skill in the art of electrical engineering that the gearmotor assembly 322 can be adapted to provide multiple degrees of movement for steering the optical axis 330 along several axes.

As further depicted by FIG. 11, a connector element 368 further connects to the shaft 326 and provides a mechanical connecting arm for connecting the camera electronics 370 to the shaft 326. The depicted camera element 320 mounts to the camera electronics 370 and the spot photometer 372 mounts atop the depicted camera element 320. In one embodiment, the spot photometer 372 is connected in electrical circuit to the camera electronics box 372 and provides the camera electronics with illumination information. In this embodiment, the camera electronics can adapt an image acquisition characteristic, such as iris disposure or shutter speed, responsive to the illumination information provided by the spot photometer 372.

With reference again to FIG. 10, the lower optical assembly 312 can be explained. As depicted in FIG. 10, the lower optical assembly has a fixedly mounted image acquisition element 340 that optically couples via the optical axis 332 to an image source. In one embodiment of the invention, the pylon assembly 300 is fitted within a housing 42 that includes a slotted card holder that allows a card or other image source to be disposed along the optical axis 332 and thereby be optically coupled via the mirror 344 to the image acquisition element 340. The illumination element 354, depicted in FIGS. 9 and 10 as a small tubular light bulb, provides sufficient illumination to illuminate the image source and thereby allow the image acquisition element 340 to capture the image of the image source.

In the embodiment depicted in FIG. 10, which can fit into a housing that has a rear slot for holding an image source, the image acquisition element 340, depicted as a camera in FIG. 10, can have a fixed lens element as the focal length along the optical axis 332 does not vary. However, it should be apparent to one of ordinary skill in the art that the image acquisition element 340 can an adjustable lens element for accommodating varying focal lengths along the optical axis 332 to properly focus an image onto the image plain 350.

With reference again to FIG. 1, the signal processor 14 can include a frame grabber 38. The frame grabber 38 can connect to the data capture pylon 12 via data cable 24. The data cable 24 can electrically connect the optical conversion element 44 within data capture pylon 12 to the frame grabber 38. Data signals representative of image data acquired by the optical conversion element 44 can be transmitted via cable 24 to the frame grabber 38 for acquisition by the signal processor 14. Frame grabber 38 can acquire image data from the conversion element 44 responsive to synch signal transmitted with the video data. Frame grabber cards suitable for practice with the present invention are well known in the field of image acquisition and any of the available frame grabber units can be used in the present invention without departing from the scope thereof. One such frame grabber card is manufactured by the AVER Company, model number AVER 2000.

The signal processor 14 can further include a multiplexer unit for multipex capturing of image data acquired by the data capture pylon 12. In particular, for the embodiment illustrated in FIG. 9, the signal processor can include an image multiplexer unit, which can be part of the frame grabber 38 operated under software control, to acquire separate images from the multiple image acquisitions elements in the pylon assembly 300.

The signal processor 14, illustrated in FIG. 1 as a host computer, can be a user programmable processor unit of the type commonly used to control the operation of an automated machine tool. The computer 14 can operate under the control of a programmed sequence of instructions, to operate the data capture pylon 12. The programmed sequence of instructions can be conventional software program of the type suitable for controlling the selection elements, including solenoids, motor assemblies, and adjustable focus lenses, and for monitoring feedback signals from sensor elements, such as limit switches, optical encoders, strain gauges, light sensors and other sensor elements suitable for generating signals representative of the condition of a mechanical assembly. These software programs are well known in the art of control systems, and any suitable program can be practiced with this invention without departing from the scope of the invention.

The optional display unit 16 can be connected to the host computer 14 for displaying images captured by the frame grabber card 38. Display monitors suitable for displaying images represented as data signals, such as NTSC electrical video signals, are well known in the art of data acquisition and computer engineering and any of the commonly and commercially available monitored units can be employed by the present invention. One such unit is manufactured by the Digital Equipment Corporation, Marlborough, Mass., and is a DEC, 14-inch VGA monitor.

The optional disk drive unit 40 illustrated in FIG. 1 can read or write data to or from a storage medium of the type suitable for use with the drive unit 40. The drive unit 40 can access data such as text information or graphical information, for integration into an identification card. Additionally, the drive unit 40 can access instructions such as software programs for reading program sequences designed for a particular application of the system 10.

The collected data to be printed can be assembled into data fields assigned according to the design of the document to be produced. These fields may include bit mapped portrait images, fingerprint images other bit mapped imagewise data, text in defined fonts, graphic designs for the document format, or bar code patterns. These are compiled by the computer into a complete print file which is then transmitted to the printer, from which the actual printing is performed. A line of pixels printed by the printer, depending on the specific document layout, may include pixel elements of any of the above listed data elements, with each pixel assigned a print density value for each of the cyan, magneta, yellow, and black components.

Additionally, the printer 22 can include a magnetic stripe encoder for encoding information onto a magnetic stripe fixed onto an identification card. These magnetic stripe encoders are well known in the art of computer engineering, and any magnetic stripe unit suitable for encoding information onto a magnetic stripe can be practiced with the present invention, without departing from the scope of the invention.

The printer 22 can be connected to the host computer 14 by an optional modem 20. The modem 20 forms a telecommunication link that electronically couples the host computer 14 to a printer 22. In one embodiment of the present invention, the printer 22 is located at a central printing facility for the mass production of identification cards. A single printer 22 can be connected via a telecommunication link to a number of host computers 14 located at data acquisition stations equipped with systems 10 for capturing data. Alternatively, the printer 22 can have a direct hard wire connection to the host computer 14. The hard-wired printer 22 can be a dedicated printer for producing identification cards for the host computer 14 hard-wired connected thereto. A printer 22, suitable for practice with the present invention, can be a large production model identification card printer suitable for high-speed manufacture of identification cards. Such as printers of the type manufactured by the Datacard Corporation including the Datacard 9000. Alternatively, dedicated printers 22 directly hard-wired to host computer 14 can be any of the common and commercially available printers suitable for the typical office environment. Such printers are manufactured by the Canon Corporation and the Hewlett-Packard Corporation, and are well known in the art of computer engineering.

The invention has been described above with reference to certain illustrated embodiments. The description of the illustrated embodiments provide a more fuller understanding of the invention, however, the invention is not to be limited to the illustrated embodiments, or the description thereof, and the invention is to be interpreted according to the claims set forth herein.

We claim:

1. Signal generating apparatus for generating at its output electrical data signals representative of a plurality of spatially separated object sources, comprising a. a housing having said plurality of object sources disposed thereon, b. a single image plane disposed at a spatially fixed position relative to said housing, c. at least one image path optically coupling said plurality of object sources and said image plane, d. an optical conversion element positioned relative to said housing for acquiring visual images from said image plane and generating said elemental data signals representative of said visual images, and e. selection means positioned relative to said image plane for selectively and alterative coupling visual images from each of said object sources along one of said image paths onto said image plane.

2. Apparatus in accordance with claim 1 wherein said selection means includes optical shutters for selectively occluding or transmitting said visual images.

3. Apparatus in accordance with claim 2 wherein said optical shutters include polarized filter elements for forming a polarized light filter to occlude one of said image paths.

4. Apparatus in accordance with claim 1 and further including magnetic sensor means for sensing information stored on a magnetic medium and providing on said output a series of electrical signals representative of said information.

5. Apparatus in accordance with claim 1 wherein one of said object sources comprises a bar code and wherein said apparatus further comprises means for imaging a bar code image onto said image plane.

6. Apparatus in accordance with claim 1 wherein one of said object sources is positioned in a variable location transverse to said optical path and wherein said apparatus further comprises a plurality of image paths optically coupling separate ones of said object source onto said image plane and, a steering element for transversely adjusting said optical path to optically couple one of said object sources with said image plane.

7. Apparatus in accordance with claim 6 wherein said steering element comprises a steering-mirror disposed within one of said image paths and rotatably mounted to said housing.

8. Apparatus in accordance with claim 6 wherein said selection means further includes projection means for projecting visual images along one of said optical paths.

9. Apparatus in accordance with claim 1 including a plurality of image paths coupling separate ones of said object sources onto said image plane, and wherein said selection means further comprises a flip-mirror disposed within one of said image paths and being pivotably mounted to said housing for pivoting said image plane into optical engagement with a first image source or a second object source.

10. Apparatus in accordance with claim 1 wherein said image plane is rotatably mounted at said spatially fixed point for rotating into optical engagement with one of a plurality of optical paths.

11. Apparatus in accordance with claim 1 wherein said selection means further comprises illumination elements for providing in a controlled sequence illumination to selected ones of said plurality of object sources.

12. Apparatus in accordance with claim 11 wherein said illumination elements comprise strobe lights.

* * * * *